(12) United States Patent
Shao et al.

(10) Patent No.: US 12,314,886 B2
(45) Date of Patent: May 27, 2025

(54) METHODS AND INTERNET OF THINGS SYSTEMS FOR GAS REPAIR-REPORTING MANAGEMENT BASED ON CALL CENTERS OF SMART GAS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Guanghua Huang, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 172 days.

(21) Appl. No.: 18/190,161

(22) Filed: Mar. 27, 2023

(65) Prior Publication Data
US 2023/0230018 A1 Jul. 20, 2023

(30) Foreign Application Priority Data
Mar. 3, 2023 (CN) .......................... 202310196793.8

(51) Int. Cl.
*G06Q 10/08* (2024.01)
*G16Y 10/35* (2020.01)
*G16Y 40/20* (2020.01)

(52) U.S. Cl.
CPC ............. *G06Q 10/08* (2013.01); *G16Y 10/35* (2020.01); *G16Y 40/20* (2020.01)

(58) Field of Classification Search
None
See application file for complete search history.

(56) References Cited

U.S. PATENT DOCUMENTS

| 2019/0302719 | A1* | 10/2019 | Aljuaid | ............... | G08B 21/182 |
| 2019/0340914 | A1* | 11/2019 | Israelsen | ............... | H04N 23/23 |
| 2022/0082409 | A1* | 3/2022 | Ukil | ....................... | G16Y 10/35 |

(Continued)

FOREIGN PATENT DOCUMENTS

CN 113263915 A 6/2021

*Primary Examiner* — John B Walsh
*Assistant Examiner* — Abderrahmen Chouat
(74) *Attorney, Agent, or Firm* — METIS IP LLC

(57) ABSTRACT

The present disclosure provides methods and Internet of Things (IoT) systems for gas repair-reporting management based on a call center of smart gas. The method includes obtaining historical gas use data and historical gas repair-reporting data; generating, based on the historical gas use data and the historical gas repair-reporting data, first gas repair-reporting areas; generating, at least based on the historical gas use data and the historical gas repair-reporting data of the first gas repair-reporting areas, future gas repair-reporting data of the first gas repair-reporting areas; generating, based on the first gas repair-reporting areas and the future gas repair-reporting data of the first gas repair-reporting areas, second gas repair-reporting areas and future gas repair-reporting data corresponding to the second gas repair-reporting areas; and generating, based on the future gas repair-reporting data of the second gas repair-reporting areas, a maintenance personnel arrangement plan.

14 Claims, 5 Drawing Sheets

(56) References Cited

U.S. PATENT DOCUMENTS

| | | | |
|---|---|---|---|
| 2022/0092234 A1* | 3/2022 | Karri | G06F 30/18 |
| 2022/0163365 A1* | 5/2022 | Shao | H04L 67/12 |
| 2022/0170810 A1* | 6/2022 | Miller, II | G01S 19/01 |
| 2023/0007082 A1* | 1/2023 | Kelly | H04L 67/12 |
| 2023/0055822 A1* | 2/2023 | Amir | H04L 67/12 |
| 2024/0029232 A1* | 1/2024 | Korjani | G06V 20/52 |
| 2024/0183832 A1* | 6/2024 | LaFranchi | G01N 33/0037 |

* cited by examiner

200

```
┌─────────────────────────────────────────────────────┐
│ Obtaining, based on a smart gas object platform,    │
│ historical gas use data and historical gas          │──~ 210
│ repair-reporting data through a smart gas sensor    │
│ network platform                                    │
└─────────────────────────────────────────────────────┘
                          ↓
┌─────────────────────────────────────────────────────┐
│ Generating, based on the historical gas use data    │
│ and the historical gas repair-reporting data, a     │──~ 220
│ plurality of first gas repair-reporting areas       │
└─────────────────────────────────────────────────────┘
                          ↓
┌─────────────────────────────────────────────────────┐
│ Generating, at least based on the historical gas    │
│ use data of the plurality of first gas repair-      │
│ reporting areas and the historical gas repair-      │──~ 230
│ reporting data of the plurality of first gas        │
│ repair-reporting areas, future gas repair-reporting │
│ data of the plurality of first gas repair-          │
│ reporting areas                                     │
└─────────────────────────────────────────────────────┘
                          ↓
┌─────────────────────────────────────────────────────┐
│ Generating, based on the plurality of first gas     │
│ repair-reporting areas and the future gas repair-   │
│ reporting data of the plurality of first gas        │──~ 240
│ repair-reporting areas, a plurality of second gas   │
│ repair-reporting areas and future gas repair-       │
│ reporting data corresponding to the plurality of    │
│ second gas repair-reporting areas                   │
└─────────────────────────────────────────────────────┘
                          ↓
┌─────────────────────────────────────────────────────┐
│ Generating, based on the future gas repair-         │
│ reporting data of the plurality of second gas       │──~ 250
│ repair-reporting areas, a maintenance personnel     │
│ arrangement plan                                    │
└─────────────────────────────────────────────────────┘
```

Generating, based on the plurality of first gas repair-reporting areas and the future gas repair-reporting data of the plurality of first gas repair-reporting areas, area attributes of the plurality of first gas repair-reporting areas ~ 410

Generating the plurality of second gas repair-reporting areas by fusing the plurality of first gas repair-reporting areas based on the area attributes ~ 420

FIG. 4

METHODS AND INTERNET OF THINGS SYSTEMS FOR GAS REPAIR-REPORTING MANAGEMENT BASED ON CALL CENTERS OF SMART GAS

CROSS-REFERENCE TO RELATED APPLICATION

This application claims priority of Chinese Patent Application No. 202310196793.8 filed on Mar. 3, 2023, the entire contents of which are entirely incorporated herein by reference.

TECHNICAL FIELD

The present disclosure relates to the field of an Internet of Things (IoT) technology and a gas management system, and in particular, to methods and Internet of Things systems for gas repair-reporting management based on a call center of smart gas.

BACKGROUND

As gas becomes more widespread, a gas-related problem (e.g., a gas leakage, an insufficient supply of gas pipeline, a gas meter fault, etc.) is increasing. If gas repair-reporting cannot be promptly resolved and fed back, people's normal life order and personal safety may be affected.

In view of how to improve the efficiency in solving the problem, Chinese Patent Application No. 113283915A has provided a gas call center business processing method. The focus of Chinese Patent Application No. 113283915A is to identify a business type corresponding to the business need reported by the user from a client to form a business work order, assign the business work order to the corresponding business personnel, and supervise a processing progress of the business work order. However, due to different occurrence frequencies of business needs of different business types, it is still impossible to reduce the waiting costs of all users while improving the efficiency.

Therefore, it is desirable to provide a method and an Internet of Things system for gas repair-reporting management based on a call center of smart gas. In this way, a balance between the efficiency of the call center and the waiting costs of all users may be achieved, thereby improving the efficiency of handling a repair-reporting problem to ensure people's daily gas use and personal safety.

SUMMARY

One or more embodiments of the present disclosure provide a method for gas repair-reporting management based on a call center of smart gas. The method is implemented by an Internet of Things (IoT) system for gas repair-reporting management based on a call center of smart gas and the method includes: obtaining, based on the smart gas object platform, historical gas use data and historical gas repair-reporting data through the smart gas sensor network platform; generating, based on the historical gas use data and the historical gas repair-reporting data, a plurality of first gas repair-reporting areas; generating, at least based on the historical gas use data of the plurality of first gas repair-reporting areas and the historical gas repair-reporting data of the plurality of first gas repair-reporting areas, future gas repair-reporting data of the plurality of first gas repair-reporting areas, the historical gas repair-reporting data at least including a historical gas repair-reporting volume and a historical gas repair-reporting level and the future gas repair-reporting data at least including a future gas repair-reporting volume and a future gas repair-reporting level; generating, based on the plurality of first gas repair-reporting areas and the future gas repair-reporting data of the plurality of first gas repair-reporting areas, a plurality of second gas repair-reporting areas and future gas repair-reporting data corresponding to the plurality of second gas repair-reporting areas; and generating, based on the future gas repair-reporting data of the plurality of second gas repair-reporting areas, a maintenance personnel arrangement plan.

One or more embodiments of the present disclosure provide an Internet of Things (IoT) system for gas repair-reporting management based on a call center of smart gas, including a smart gas management platform, a smart gas sensor network platform, and a smart gas object platform that interact in turn. The smart gas management platform is configured to: obtain, based on the smart gas object platform, historical gas use data and historical gas repair-reporting data through the smart gas sensor network platform; generate, based on the historical gas use data and the historical gas repair-reporting data, a plurality of first gas repair-reporting areas; generate, at least based on the historical gas use data of the plurality of first gas repair-reporting areas and the historical gas repair-reporting data of the plurality of first gas repair-reporting areas, future gas repair-reporting data of the plurality of first gas repair-reporting areas, the historical gas repair-reporting data at least including a historical gas repair-reporting volume and a historical gas repair-reporting level and the future gas repair-reporting data at least including a future gas repair-reporting volume and a future gas repair-reporting level; generate, based on the plurality of first gas repair-reporting areas and the future gas repair-reporting data of the plurality of first gas repair-reporting areas, a plurality of second gas repair-reporting areas and future gas repair-reporting data corresponding to the plurality of second gas repair-reporting areas; and generate, based on the future gas repair-reporting data of the plurality of second gas repair-reporting areas, a maintenance personnel arrangement plan.

One or more embodiments of the present disclosure provide a non-transitory computer-readable storage medium storing computer instructions. When reading the computer instructions in the storage medium, a computer implements the method for gas repair-reporting management based on a call center of smart gas.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which the same reference numbers represent the same structures, wherein:

FIG. 2 is a flowchart illustrating an exemplary process of a method for gas repair-reporting management based on a call center of smart gas according to some embodiments of the present disclosure;

FIG. 4 is a flowchart illustrating an exemplary process for generating a plurality of second gas repair-reporting areas and future gas repair-reporting data corresponding to the plurality of second gas repair-reporting areas according to some embodiments of the present disclosure.

DETAILED DESCRIPTION

Figure 1:
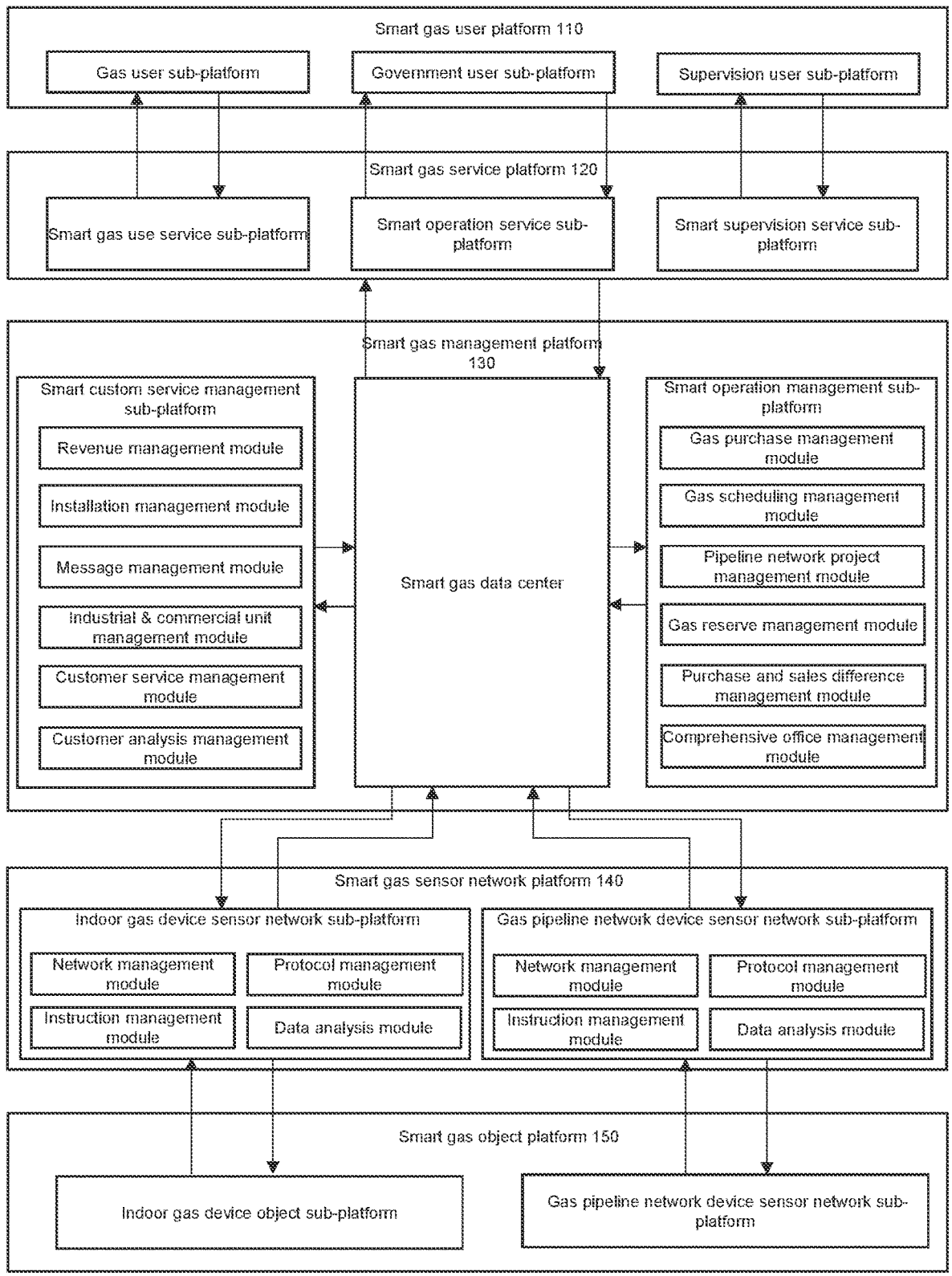
FIG. 1 is a schematic diagram illustrating a platform structure of an Internet of Things (IoT) system for gas repair-reporting management based on a call center of smart gas according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating a platform structure of an Internet of Things (IoT) system for gas repair-reporting management based on a call center of smart gas according to some embodiments of the present disclosure.

In some embodiments, as shown in FIG. 1, an IoT system 100 for gas repair-reporting management based on a call center of smart gas may include a smart gas user platform 110, a smart gas service platform 120, a smart gas management platform 130, a smart gas sensor network platform 140, and a smart gas object platform 150.

In some embodiments, a maintenance personnel arrangement plan may be determined by implementing the IoT system 100 for managing a gas repair-reporting based on a call center of smart gas disclosed in the present disclosure.

The smart gas user platform 110 may be a platform for interacting with a user. In some embodiments, the smart gas user platform 110 may be configured as a terminal device. For example, the terminal device may include a mobile device, a tablet computer, or the like, or any combination thereof. In some embodiments, the smart gas user platform 110 may be used to feed back a reminder related to the maintenance personnel arrangement plan to the user.

In some embodiments, the smart gas user platform 110 is provided with a gas user sub-platform, a government user sub-platform, and a supervision user sub-platform. The gas user sub-platform is oriented to a gas user and provides information such as data related to gas usage data and a solution to a gas problem. The gas user refers to a user who uses the gas. In some embodiments, the gas user sub-platform may correspond to and interact with a smart gas use service sub-platform to obtain a safe gas use service. The government user sub-platform provides data related to gas operation for a government user. The government user refers to a user of a government gas operation relevant department. In some embodiments, the government user sub-platform may obtain maintenance management information, such as scheduling of the maintenance personnel. The supervision user sub-platform is oriented to a supervision user and supervises the operation of the IoT system for gas repair-reporting management based on a call center of smart gas. The supervision user refers to a user of a safety department. In some embodiments, the supervision user sub-platform may correspond to and interact with a smart supervision service sub-platform to obtain a service required by safety supervision.

In some embodiments, the smart gas user platform 110 may perform a bidirectional interaction with the smart gas service platform 120 downwards, send the gas user's repair-reporting information to the smart gas use service sub-platform, and receive the maintenance personnel arrangement plan uploaded by the smart gas use service sub-platform, etc.

The smart gas service platform 120 may be a platform for receiving and transmitting data and/or information. For example, the smart gas service platform 120 may receive a gas maintenance management information query instruction issued by the government user sub-platform and send the gas maintenance management information to the government user sub-platform. In some embodiments, the smart gas service platform 120 is provided with a smart gas use service sub-platform, a smart operation service sub-platform, and a smart supervision service sub-platform.

In some embodiments, the smart gas service platform 120 may interact with the smart gas management platform 130 downwards. The smart gas service platform 120 may issue the gas maintenance management information query instruction to a smart gas data center and receive the gas maintenance management information uploaded by the smart gas data center; and receive the gas maintenance management information query instruction issued by the government user sub-platform and upload the gas maintenance management information to the government user sub-platform, etc.

The smart gas management platform 130 may refer to a platform for overall planning and coordinating connections and cooperation among various functional platforms, gathering all information of the IoT system, and providing perception management and control management functions for the IoT operation system. For example, the smart gas management platform 130 may obtain information about a gas repair-reporting problem, etc.

In some embodiments, the smart gas management platform 130 is provided with a smart customer service management sub-platform, a smart operation management sub-platform, and a smart gas data center. Each management sub-platform may bidirectionally interact with the smart gas data center. The smart gas data center summarizes and stores all the operation data of the system and each management sub-platform may obtain data from the smart gas data center and feedback relevant operational information. For example, the smart gas data center may receive the gas maintenance management information query instruction issued by the operation service sub-platform and customer feedback information issued by the smart gas use service sub-platform.

In some embodiments, the smart customer service management sub-platform may be configured for revenue management, installation management, message management, industrial and commercial unit management, customer service management, and customer analysis management, etc., and may check the customer feedback information and perform corresponding reply processing, etc. In some embodiments, the smart operation management sub-platform may be configured for gas purchase management, gas scheduling management, pipeline network project management, gas reserve management, purchase and sales difference management, and comprehensive office management, etc., and may check work order information, staffing, a progress of a pipeline network project and implement the pipeline network project management, etc.

In some embodiments, the smart operation management sub-platform and the smart service management sub-platform may exchange information with the smart gas service platform 120 and the smart gas sensor network platform 140 through the smart gas data center. In some embodiments, the smart gas data center may receive the customer feedback information issued by the smart gas service platform 120, receive the gas maintenance management information query instruction issued by the smart gas service platform 120, and upload the gas maintenance management information to the smart gas service platform 120. The smart gas data center may further interact downward with the smart gas sensor network platform 140, issue an instruction for obtaining data related to a gas device to the smart gas sensor network platform 140, and receive the data related to the gas device uploaded by the smart gas sensor network platform 140.

The smart gas sensor network platform 140 may be a functional platform for managing sensor communication. The smart gas sensor network platform 140 may be configured as a communication network and a gateway to realize functions such as network management, protocol management, instruction management, and data analysis.

In some embodiments, the smart gas sensor network platform 140 may include an indoor gas device sensor network sub-platform and a gas pipeline network device sensor network sub-platform, which are respectively related to an indoor gas device object sub-platform and a gas pipeline network device object sub-platform and are respectively configured to obtain relevant data of an indoor device and relevant data of a pipeline network device. The relevant data of an indoor device and the relevant data of a pipeline network device both belong to the data related to the gas device.

In some embodiments, the smart gas sensor network platform 140 may be connected to the smart gas management platform 130 and the smart gas object platform 150 to realize functions of perceptual information sensor communication and control information sensor communication. For example, the smart gas sensor network platform 140 may receive the data related to the gas device uploaded by the smart gas object platform 150 and issue an instruction to obtain the data related to the gas device to the smart gas object platform 150; and receive the instruction for obtaining the data related to the gas device issued by the smart gas data center and upload the data related to the gas device to the smart gas data center.

The smart gas object platform 150 may be a functional platform for generating the perceptual information and executing the control information and may include the gas device and other device. The gas device may include the indoor device and the pipeline network device. Other device may include a monitoring device, a temperature sensor, a pressure sensor, etc.

In some embodiments, the smart gas object platform 150 may further be provided with the indoor gas device object sub-platform and the gas pipeline network device object sub-platform. The indoor gas device object sub-platform may include the indoor device, for example, a metering device of the gas user. The gas pipeline network device object sub-platform may include the pipeline network device, such as a pressure regulating device, a gas gate station compressor, a gas flow meter, a valve control device, a thermometer, a barometers, etc. The indoor gas device object sub-platform corresponds to the indoor gas device sensor network sub-platform and the data related to the indoor device is uploaded to the smart gas data center through the indoor gas device sensor network sub-platform. The gas pipeline network device object sub-platform corresponds to the gas pipeline network device sensor network sub-platform and the data related to the gas pipeline network device is uploaded to the smart gas data center through the gas pipeline network device sensor network sub-platform.

In some embodiments, the smart gas object platform 150 may interact upward with the smart gas sensor network platform 140, receive the instruction for obtaining the data related to the gas device issued by the smart gas sensor network platform 140 and upload the data related to the gas device to the smart gas sensor network platform 140.

One embodiment of the present disclosure achieves informatization and intelligence through a closed-loop management formed by the IoT functional architecture of the five platforms. Through the detailed and clear division of labor of the platforms, the user waiting costs can be reduced, the efficiency of the problem handling can be improved, and the IoT information processing o can be smoother and more efficient.

FIG. 2 is a flowchart illustrating an exemplary process of a method for gas repair-reporting management based on a call center of smart gas according to some embodiments of the present disclosure. As shown in FIG. 2, the process 200 includes operations 210-250.

In 210, obtaining, based on a smart gas object platform, historical gas use data and historical gas repair-reporting data through a smart gas sensor network platform.

The historical gas use data may refer to data related to gas use in a historical period of time. For example, the historical gas use data may include gas consumption in a certain historical period of time, a count of gas users in a certain historical period of time, etc.

The historical gas repair-reporting data may refer to data related to gas repair-reporting in the historical period of time. In some embodiments, the historical gas repair-reporting data may at least include a historical gas repair-reporting volume and a historical gas repair-reporting level. For more descriptions about the historical gas repair-reporting data, please refer to operation 230, which will not be repeated here.

In some embodiments, the smart gas management platform may obtain the historical gas use data and the historical gas repair-reporting data through gas operator data and a government gas operation platform, etc.

In 220, generating, based on the historical gas use data and the historical gas repair-reporting data, a plurality of first gas repair-reporting areas.

The first gas repair-reporting areas may refer to at least two sub-areas in a target area with similar historical gas use data and/or historical gas repair-reporting data. For example, the first gas repair-reporting areas may be 2 communities in the target area with a similar count of gas users, 3 communities in the target area with a similar historical gas repair-reporting frequency, etc. The target area refers to a management range corresponding to the smart gas management platform. For example, the target area may be a city. The sub-area refers to an independent area. For example, the sub-area may include a community, an office building, etc.

In some embodiments, the smart gas management platform may directly divide the geographically adjacent sub-areas with the same or similar historical gas use data and historical gas repair-reporting data in the target area into the same first gas repair-reporting area. The sub-area with similar historical gas use data and historical gas repair-reporting data refers to a sub-area where a difference between the historical gas use data and a difference between the historical gas repair-reporting data is within a first threshold and the first threshold may be set according to experience.

In some embodiments, by generating the plurality of first gas repair-reporting areas, the geographically adjacent areas with the similar historical gas use data and historical gas repair-reporting data may be combined, which can facilitate the subsequent arrangement and allocation of the maintenance personnel, improve the maintenance efficiency, reduce the non-maintenance related costs, and save manpower and material resources.

In 230, generating, at least based on the historical gas use data of the plurality of first gas repair-reporting areas and the historical gas repair-reporting data of the plurality of first gas repair-reporting areas, future gas repair-reporting data of the plurality of first gas repair-reporting areas.

In some embodiments, the historical gas repair-reporting data at least includes a historical gas repair-reporting volume and a historical gas repair-reporting level.

The historical gas repair-reporting volume may refer to a count of gas repair-reporting events at a certain position in a certain historical period of time. For more descriptions about the historical gas repair-reporting volume, please refer to the above and related descriptions thereof.

The historical gas repair-reporting level may refer to a level reflecting a severity of a historical gas repair-reporting fault. The more serious the fault reported for repair is, the higher the historical gas repair-reporting level is. For example, the historical gas repair-reporting level may include an ordinary repair-reporting level, a serious repair-reporting level, and an emergency repair-reporting level. The ordinary repair-reporting level may indicate that a gas device reported for repair is abnormal but still usable; the serious repair-reporting level may indicate that the gas device reported for repair cannot be used; the emergency repair-reporting level may indicate that the gas device reported for repair has a fault that may endanger a life of the gas user, etc.

In some embodiments, the historical gas repair-reporting level may be expressed in other ways. For example, it may be expressed by a number between 1-5. The greater the number, the higher the severity of the fault reported to repair.

The future gas repair-reporting data may refer to data related to gas repair-reporting in a predicted future period of time. In some embodiments, the future gas repair-reporting data may at least include a future gas repair-reporting volume, a future gas repair-reporting level, etc.

The future gas repair-reporting volume may refer to a count of gas repair-reporting events at a certain position in a certain future period of time. The future gas repair-reporting level may refer to a level reflecting a severity of a future gas repair-reporting fault. For specific examples, please refer to the above historical gas repair-reporting volume and historical gas repair-reporting level, which is not repeated here.

In some embodiments, the smart gas management platform may use an average value of the historical gas repair-reporting data of each first gas repair-reporting area in a plurality of historical periods of time with a same time duration as the future gas repair-reporting data of the first gas repair-reporting area. For example, if a current time is the $20^{th}$ week of 2025, the smart gas management platform may use the average value of the gas repair-reporting data of the first day of the $19^{th}$ week of 2025 of the first gas repair-reporting area 1, the gas repair-reporting data of the first day of the $18^{th}$ week of 2025 of the first gas repair-reporting area 1, and the gas repair-reporting data of the first day of the $17^{th}$ week of 2025 of the first gas repair-reporting area 1 as the gas repair-reporting data of the first day of the $21^{st}$ week of 2025 of the first gas repair-reporting area 1. By analogy, the gas repair-reporting data (i.e., the future gas repair-reporting data) of the $21^{st}$ week of 2025 of the first gas repair-reporting area 1 may be obtained.

In some embodiments, the smart gas management platform may input the historical gas use data of the plurality of first gas repair-reporting areas and the historical gas repair-reporting data of the plurality of first gas repair-reporting areas into a gas repair-reporting model, process the historical gas use data of the plurality of first gas repair-reporting areas and the historical gas repair-reporting data of the plurality of first gas repair-reporting areas using the gas repair-reporting model, and output the future gas repair-reporting data of the plurality of first gas repair-reporting areas. The gas repair-reporting model is a machine learning model. For more descriptions on generating the future gas repair-reporting data of the plurality of first gas repair-reporting areas based on the gas repair-reporting model, please refer to FIG. 3 and related descriptions thereof.

In 240, generating, based on the plurality of first gas repair-reporting areas and the future gas repair-reporting data of the plurality of first gas repair-reporting areas, a plurality of second gas repair-reporting areas and future gas repair-reporting data corresponding to the plurality of second gas repair-reporting areas.

The second gas repair-reporting area may refer to an area formed by fusing the plurality of first gas repair-reporting areas. For example, a second gas repair-reporting area A may be an area formed by fusion of a first gas repair-reporting area a and a first gas repair-reporting area b with the same future gas repair-reporting data and geographically adjacent.

In some embodiments, the smart gas management platform may divide the plurality of geographically adjacent first gas repair-reporting areas with a difference of the future gas repair-reporting data smaller than a second threshold into the second gas repair-reporting area. The future gas repair-reporting area corresponding to the second gas repair-reporting area is the average value of the future gas repair-reporting data of the plurality of first gas repair-reporting areas.

In some embodiments, the smart gas management platform may generate, based on the plurality of first gas repair-reporting areas and the future gas repair-reporting data of the plurality of first gas repair-reporting areas, area attributes of the plurality of first gas repair-reporting areas. The smart gas management platform may further generate the plurality of second gas repair-reporting areas by fusing the plurality of first gas repair-reporting areas based on the area attributes. For more descriptions about generating the plurality of second gas repair-reporting areas based on the area attributes, please refer to FIG. 4 and the related descriptions thereof.

In 250, generating, based on the future gas repair-reporting data of the plurality of second gas repair-reporting areas, a maintenance personnel arrangement plan.

The maintenance personnel arrangement plan may refer to a plan for arranging the maintenance personnel in response to the gas repair-reporting. For example, the maintenance personnel arrangement plan may include various information such as a count of maintenance personnel, a maintenance time, and a maintenance position. Exemplarily, the maintenance personnel arrangement plan may be that on Jan. 1, 2025, 3 maintenance persons are arranged to go to a second gas repair-reporting area 1 for maintenance, 5 maintenance persons are arranged to a second gas repair-reporting area 2 for maintenance, and 10 maintenance persons are arranged to a second gas repair-reporting area 3 for maintenance.

In some embodiments, the smart gas management platform may organize the future gas repair-reporting data and the maintenance personnel arrangement plan into a first data comparison table and determine the maintenance personnel arrangement plan based on the first data comparison table. For example, in the first data comparison table, when the future gas repair-reporting volume is 0-10 cases and the future gas repair-reporting level is the ordinary level, the maintenance personnel arrangement plan is to arrange 3 maintenance persons to go to the maintenance position for maintenance within 24 hours. Therefore, when the future gas repair-reporting volume of the second gas repair-reporting area 1 is 5 cases and the future gas repair-reporting level is the ordinary level, the maintenance personnel arrangement plan is to arrange 3 maintenance persons to go to the second gas repair-reporting area 1 for maintenance within 24 hours.

In some embodiments, the smart gas management platform may generate, based on the future gas repair-reporting data of the plurality of second gas repair-reporting areas, maintenance personnel demand data; and generate, based on the maintenance personnel demand data, the maintenance personnel arrangement plan.

The maintenance personnel demand data may refer to data related to a demand for maintenance personnel, such as a demand for the count of maintenance personnel, a demand for the maintenance time, a demand for the maintenance position demand, etc.

In some embodiments, the smart gas management platform may organize the future gas repair-reporting data and the maintenance personnel demand data into a second data comparison table and determine the maintenance personnel demand data based on the second data comparison table. For example, in the second data comparison table, when the future gas repair-reporting volume is 0-10 cases and the future gas repair-reporting level is the serious level, the maintenance personnel demand data is that the maintenance time demand is within 6 hours and the demand for the count of maintenance personnel is 2 persons/case. Therefore, when the future gas repair-reporting volume of the second gas repair-reporting area 1 is 3 cases and the future gas repair-reporting level is the serious level, the maintenance personnel arrangement plan is to arrange 6 maintenance persons to go to the second gas repair-reporting area 1 for maintenance within 6 hours.

In some embodiments, the smart gas management platform may summarize the obtained maintenance personnel demand data and directly generate the maintenance personnel arrangement plan. In some embodiments, the smart gas management platform may obtain manual adjustment of the maintenance personnel demand data based on the smart gas user platform through the smart gas service platform and generate the maintenance personnel arrangement plan based on the manual adjustment of the maintenance personnel demand data.

In some embodiments of the present disclosure, the maintenance personnel demand data may be generated based on the future gas repair-reporting data of the plurality of second gas repair-reporting areas and the maintenance personnel arrangement plan may be generated based on the maintenance personnel demand data, so that a process of determining the maintenance personnel arrangement plan is more reasonable, more in line with an actual situation when repairs are reported in different areas, more efficient, and labor costs can be saved.

In some embodiments of the present disclosure, the first gas repair-reporting area is generated by obtaining the historical gas use data and the historical gas repair-reporting data, the second gas repair-reporting area and the future gas repair-reporting data corresponding to the plurality of second gas repair-reporting areas are generated, and the maintenance personnel arrangement plan is generated, so that the future gas repair-reporting data updated dynamically in real time in different areas may be determined, which is conducive to generating an accurate and practical maintenance personnel arrangement plan, shortening the time for determining the maintenance personnel arrangement plan, saving the labor costs, and improving a processing efficiency of the gas repair-reporting. Therefore, the user of the government gas operation departments can obtain and implement the maintenance personnel arrangement plan in a timely manner.

Figure 3:
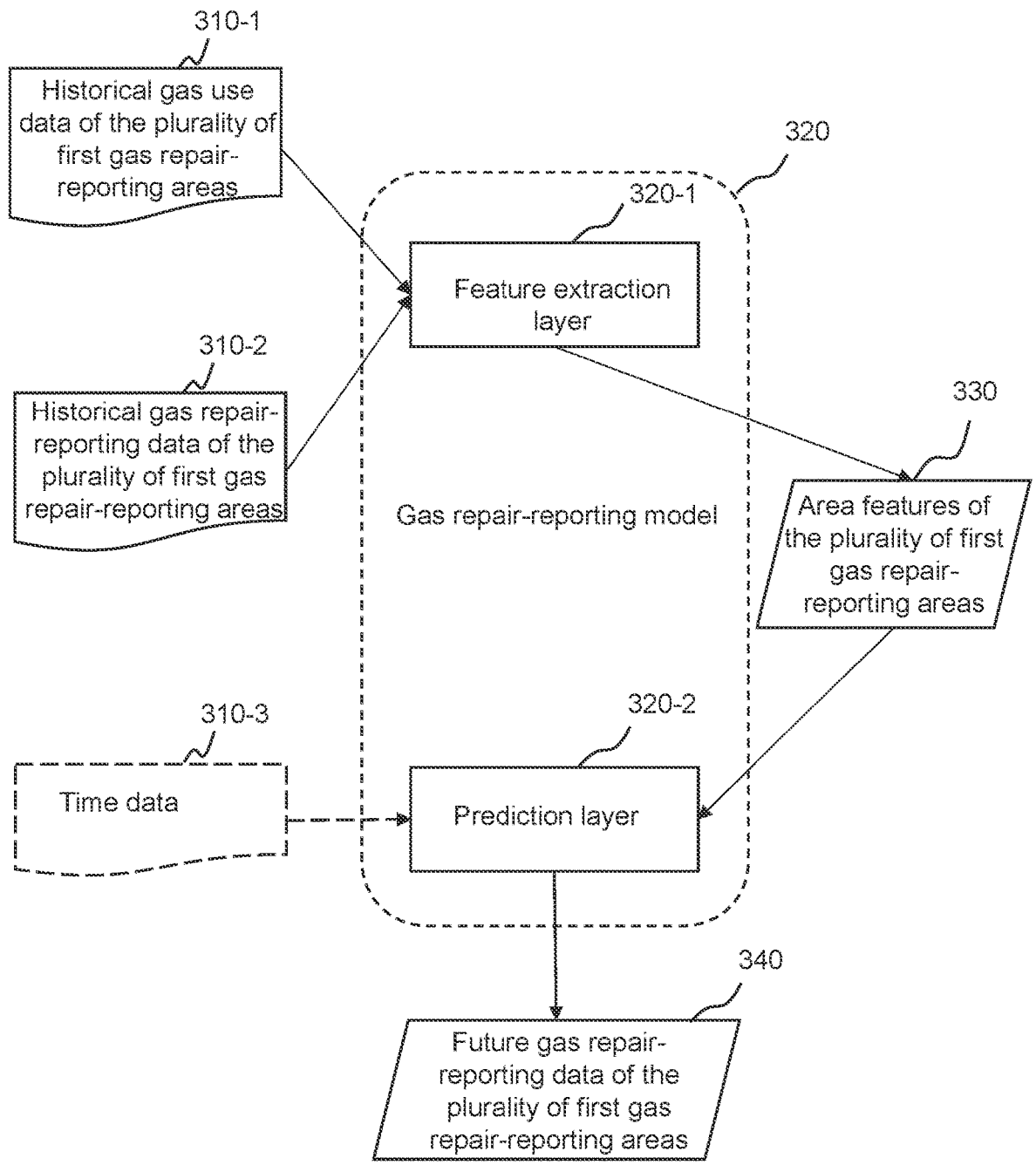
FIG. 3 is a schematic diagram illustrating a process for generating future gas repair-reporting data of a plurality of first gas repair-reporting areas based on a gas repair-reporting model according to some embodiments of the present disclosure.

FIG. 3 is a schematic diagram illustrating a process for generating future gas repair-reporting data of a plurality of first gas repair-reporting areas based on a gas repair-reporting model according to some embodiments of the present disclosure.

In some embodiments, a smart gas management platform may input the historical gas use data of the plurality of first gas repair-reporting areas and the historical gas repair-reporting data of the plurality of first gas repair-reporting areas into the gas repair-reporting model, process the historical gas use data of the plurality of first gas repair-reporting areas and the historical gas repair-reporting data of the plurality of first gas repair-reporting areas using the gas repair-reporting model, and output the future gas repair-reporting data of the plurality of first gas repair-reporting areas.

In some embodiments, the gas repair-reporting model may be a model for determining the future gas repair-reporting data of the plurality of first gas repair-reporting areas. In some embodiments, the gas repair-reporting model is a machine learning model. For example, the gas repair-reporting model may include a neural networks (NN) model, a deep neural networks (DNN) model, a convolutional neural networks (CNN) model, a recurrent neural networks (RNN) model, a Transformer model, or the like, or any combination thereof.

In some embodiments, an input of the gas repair-reporting model may include the historical gas use data of the plurality of first gas repair-reporting areas and the historical gas repair-reporting data of the plurality of first gas repair-reporting areas and the output of the gas repair-reporting model may include the future gas repair-reporting data of the plurality of first gas repair-reporting areas.

In some embodiments, as shown in FIG. 3, a gas repair-reporting model 320 may include a feature extraction layer 320-1 and a prediction layer 320-2.

An input of the feature extraction layer 320-1 is the historical gas use data 310-1 of the plurality of first gas repair-reporting areas and the historical gas repair-reporting data 310-2 of the plurality of first gas repair-reporting areas and the output is area features 330 of the plurality of first gas repair-reporting areas. An input of the prediction layer 320-2 is the area features of the plurality of first gas repair-reporting areas 330 and the output is future gas repair-reporting data 340 of the plurality of first gas repair-reporting areas.

In some embodiments, the feature extraction layer 320-1 may be the Transformer model.

The feature extraction layer 320-1 may be configured to determine the area features 330 of the plurality of first gas repair-reporting areas. The input of feature extraction layer 320-1 may include the historical gas use data 310-1 of the plurality of first gas repair-reporting areas and the historical gas repair-reporting data 310-2 of the plurality of first gas repair-reporting areas and the output may include the area features 330 of the plurality of first gas repair-reporting areas.

For example, the historical gas use data 310-1 of the plurality of first gas repair-reporting areas may include a sequence $$\begin{bmatrix} 270 & 285 & 282 & 294 & 300 & 360 & 375 \\ 900 & 950 & 940 & 980 & 1000 & 1200 & 1250 \end{bmatrix}$$

consisting of a historical gas consumption and a count of the gas users per day of a week in the history of the first gas repair-reporting area 1; a sequence $$\begin{bmatrix} 120 & 135 & 150 & 141 & 153 & 240 & 234 \\ 400 & 450 & 500 & 470 & 510 & 800 & 780 \end{bmatrix}$$

consisting of a historical gas consumption and a count of the gas users per day of a week in the history of the first gas repair-reporting area 2, etc., where the first row indicates the gas consumption and the second row indicates the count of the gas users.

The historical gas repair-reporting data 310-2 of the plurality of first gas repair-reporting areas may include a sequence $$\begin{bmatrix} 6 & 4 & 0 & 1 & 7 & 3 & 2 \\ (2,2,2) & (1,2,1) & (0,0,0) & (1,0,0) & (1,1,5) & (0,1,2) & (2,0,0) \end{bmatrix}$$

consisting of the historical gas repair-reporting volume and the repair-reporting volume corresponding to each historical gas repair-reporting level per day of a week in the history of the first gas repair-reporting area 1; a sequence $$\begin{bmatrix} 5 & 7 & 2 & 3 & 6 & 3 & 1 \\ (2,2,1) & (4,2,1) & (0,2,0) & (1,0,2) & (1,5,0) & (0,1,2) & (1,0,0) \end{bmatrix}$$

consisting of the historical gas repair-reporting volume and the repair-reporting volume corresponding to each historical gas repair-reporting level per day of a week in the history of the first gas repair-reporting area 2, etc., where the first row indicates the historical gas repair-reporting volume and the second row indicates the repair-reporting volume corresponding to each historical gas repair-reporting level (the three numbers respectively indicates the ordinary repair-reporting volume, the serious repair-reporting volume, and the emergency repair-reporting volume).

The area features of the plurality of first gas repair-reporting areas 330 may refer to feature information related to the gas use and the gas repair-reporting of the first gas repair-reporting areas, for example, a use feature, a repair-reporting feature, etc. In some embodiments, the use feature may include a count of gas users, gas consumption, and a use frequency corresponding to the first gas repair-reporting area. The repair feature may include a repair-reporting volume, a repair-reporting frequency, a repeated repair-reporting rate, and a repair-reporting volume of each level corresponding to the first gas repair-reporting area. The repeated repair-reporting rate refers to a ratio of the count of the same gas repair-reporting events that occurred more than or equal to two times in a certain place in a certain period of time to a total count of repair-reporting events. The repeated repair-reporting rate is used to predict the count of faults that may occur again.

In some embodiments, the prediction layer 320-2 may be the CNN model.

The prediction layer 320-2 may be used to determine the future gas repair-reporting data 340 of the plurality of first gas repair-reporting areas. An input of the prediction layer 320-2 may include the area features 330 of the plurality of first gas repair-reporting areas and the output may include the future gas repair-reporting data 340 of the plurality of first gas repair-reporting areas.

For example, the future gas repair-reporting data 340 of the plurality of first gas repair-reporting areas may include a sequence $$\begin{bmatrix} 3 & 2 & 5 & 2 & 1 & 5 & 2 \\ (1,1,1) & (0,2,0) & (2,3,0) & (1,0,1) & (0,1,0) & (2,1,2) & (0,2,0) \end{bmatrix}$$

consisting of the further gas repair-reporting volume and the repair-reporting volume corresponding to each future gas repair-reporting level per day of a week in the future of the first gas repair-reporting area 1; a sequence $$\begin{bmatrix} 4 & 5 & 3 & 2 & 4 & 3 & 1 \\ (2,2,0) & (2,2,1) & (0,2,1) & (1,0,1) & (0,4,0) & (2,1,0) & (0,0,1) \end{bmatrix}$$

consisting of the further gas repair-reporting volume and the repair-reporting volume corresponding to each gas repair-reporting level per day of a week in the future of the first gas repair-reporting area 2, etc., where the first row indicates the future gas repair-reporting volume and the second row indicates the repair-reporting volume corresponding to each future gas repair-reporting level (the three numbers respectively indicates the ordinary repair-reporting volume, the serious repair-reporting volume, and the emergency repair-reporting volume).

In some embodiments, an input of the prediction layer may further include time data 310-3.

The time data 310-3 may refer to time information including a peak time and a trough time. The peak time may be a time with relatively high gas consumption, for example, a weekend, a holiday, etc. The trough time may be a time with relatively low gas consumption, for example, a mid-week, etc.

In some embodiments, the time data may be represented by a vector. For example, the time data may be a vector [0, 0, 0, 0, 0, 1, 1] corresponding to a week in the history, where 1 indicates the peak time (e.g., the weekend) and 0 indicates the trough time (e.g., the mid-week).

In some embodiments, the time data 310-3 may be determined based on the use feature in the area features of the plurality of first gas repair-reporting areas 330. For example, when the count of the gas users, the gas consumption, and the use frequency of the use feature of a certain first gas repair-reporting area all exceed a corresponding preset threshold, it is determined that a time corresponding to the use feature is the peak time. Otherwise, it is determined that a time corresponding to the use feature is the trough time. The preset threshold may be set according to experience. In some embodiments, the time data 310-3 may be combined as one element of the use feature of the area feature 330 of the plurality of first gas repair-reporting areas.

In some embodiments of the present disclosure, by adding the time data to the input of the prediction layer, an impact of a time factor on the future gas repair-reporting data can be considered and more accurate future gas repair-reporting data can be determined.

In some embodiments, the feature extraction layer 320-1 and the prediction layer 320-2 may be obtained through joint training. For example, the historical gas use data of a sample first gas repair-reporting area corresponding to a sample time and the historical gas repair-reporting data of the sample first gas repair-reporting area corresponding to the sample time are input to the feature extraction layer 320-1 and the area feature of the sample first gas repair-reporting area corresponding to the sample time output by the feature extraction layer 320-1 is obtained. The area feature of the sample first gas repair-reporting area corresponding to the sample time output by the feature extraction layer 320-1 is input to the prediction layer 320-2 and the future gas repair-reporting data of the first gas repair-reporting area corresponding to the sample time output by the prediction layer 320-2 is obtained.

A label of the training sample may be obtained based on the future gas repair-reporting data of the sample first gas repair-reporting area corresponding to the sample time in historical data. A future period of time corresponding to the future gas repair-reporting data is a period of time in the historical data. During a training process, the gas repair-reporting model 320 may construct a loss function based on the label and an output result of the prediction layer 320-2. At the same time, parameters of the feature extraction layer 320-1 and the prediction layer 320-2 are updated until a preset condition is met and the training is completed. The preset condition may be the loss function being smaller than a threshold, the loss function converging, or a training period reaching a threshold, or the like, or any combination thereof.

When the input of the prediction layer 320-2 includes the time data 310-3, the training sample further includes sample time data. The area feature of the sample first gas repair-reporting area corresponding to the sample time output by the feature extraction layer 320-1 and the time data 310-3 are input to the prediction layer 320-2 together.

In some embodiments of the present disclosure, the historical gas use data of the plurality of first gas repair-reporting areas, the historical gas repair-reporting data of the plurality of first gas repair-reporting areas, and the time data are processed using the gas repair-reporting model including the feature extraction layer and the prediction layer to obtain the future gas repair-reporting data of the plurality of first gas repair-reporting areas, which is conducive to solving the problem that it is difficult to obtain the label when training the feature extraction layer alone. Moreover, the jointly training the feature extraction layer and the prediction layer can not only reduce a count of samples needed, but also improve the training efficiency.

In some embodiments of the present disclosure, by generating the future gas repair-reporting data of the plurality of first gas repair-reporting area based on the gas repair-reporting model, the future gas repair-reporting data may be determined more accurately in combination with the actual condition, thereby reducing the human labor costs and a waste of resources required for manual evaluation and determination.

FIG. 4 is a flowchart illustrating an exemplary process for generating a plurality of second gas repair-reporting areas and future gas repair-reporting data corresponding to the plurality of second gas repair-reporting areas according to some embodiments of the present disclosure. As shown in FIG. 4, the process 400 includes operations 410-420.

In 410, generating, based on the plurality of first gas repair-reporting areas and the future gas repair-reporting data of the plurality of first gas repair-reporting areas, area attributes of the plurality of first gas repair-reporting areas.

The area attributes may refer to information related to a geographical location of the area and the gas repair-reporting. For example, the area attributes may include central position coordinates of the plurality of first gas repair-reporting areas, future gas repair-reporting volumes of the plurality of first gas repair-reporting areas, future gas repair-reporting frequencies of the plurality of first gas repair-reporting areas, and future gas repair-reporting levels of the plurality of first gas repair-reporting areas, etc.

The central position coordinate may refer to a position coordinate of a geometric center of a certain area. For example, the central position coordinate of the first gas repair-reporting area 1 may be the position coordinate ($x_1$, $y_1$) of the geometric center A.

The future gas repair-reporting frequency may refer to a frequency of occurrence of gas repair-reporting events at a certain position in a certain future period of time. For example, the future gas repair-reporting frequency may be that within the next two days, the frequency of occurrence of gas repair-reporting event of the first gas repair-reporting area 1 is 10 cases per day. For more descriptions about the future gas repair-reporting volume of the plurality of first gas repair-reporting areas and the future gas repair-reporting level of the plurality of first gas repair-reporting areas, please refer to FIG. 1 and the related descriptions thereof.

In some embodiments, a smart gas management platform may generate the area attributes in various ways. For example, the smart gas management platform may obtain the central position coordinate of the first gas repair-reporting area through web crawling, a third-party platform, and a storage device inside or outside the IoT system for gas repair-reporting management based on a call center of smart gas, etc. As another example, the smart gas management platform may obtain the future gas repair-reporting volumes of the plurality of first gas repair-reporting areas, the future gas repair-reporting frequencies of the plurality of first gas repair-reporting areas, and the future gas repair-reporting levels of the plurality of first gas repair-reporting areas using a gas repair-reporting model.

In some embodiments, a frequency of determining the area attributes is related to time data. The frequency of determining the area attributes may refer to a count of times the area attributes are determined per unit time, for example, the frequency of determining the area attributes may be 1 time per day. For more descriptions about the time data, please refer to FIG. 3 and related descriptions thereof.

In some embodiments, the smart gas management platform may determine the frequency of determining the area attributes based on the time data, for example, during a peak time (e.g., the weekend), the frequency of determining the area attributes may be 5 times per day; during a trough time (e.g., the mid-week), the frequency of determining the area attributes may be 1 time per day.

In some embodiments of the present disclosure, the frequency of determining the area attributes is related to the time data and the frequency of determining the area attributes may be flexibly adjusted according to an actual gas use condition, so that the determined area attributes is more accurate and real-time.

In 420, generating the plurality of second gas repair-reporting areas by fusing the plurality of first gas repair-reporting areas based on the area attributes.

In some embodiments, the smart gas management platform may construct area attribute vectors according to the area attributes of the plurality of first gas repair-reporting areas. For example, the smart gas management platform may construct an area attribute vector $((x_1, y_1), 5, 5, (4, 1, 0))$ based on the central position coordinate $(x_1, y_1)$ of the first gas repair-reporting area 1, the future gas repair-reporting volume in the next day of 5 cases, the future gas repair-reporting frequency of 5 cases per day including 4 ordinary cases, 1 serious case, and no emergency case. The smart gas management platform may calculate a distance between the area attribute vectors of the plurality of first gas repair-reporting areas. If the distance is smaller than a third threshold, the plurality of geographically adjacent first gas repair-reporting areas with the distance smaller than the third threshold may be fused to generate the plurality of second gas repair-reporting areas. The third threshold may be set according to experience. For more descriptions on constructing the area attribute vector, please refer to FIG. 5 and the related descriptions thereof.

In some embodiments, the smart gas management platform may perform a cluster analysis based on the area attributes to generate the plurality of second gas repair-reporting areas. For more descriptions about generating the plurality of second gas repair-reporting areas by performing the cluster analysis based on the area attributes, please refer to FIG. 5 and the related descriptions thereof.

In some embodiments of the present disclosure, the area attributes are generated based on the plurality of first gas repair-reporting areas and the future gas repair-reporting data of the plurality of first gas repair-reporting areas, and the plurality of second gas repair-reporting areas are further generated by fusing the plurality of first gas repair-reporting areas, so that the plurality of second gas repair-reporting areas can be determined based on various factors and make the determination process more accurate and efficient.

Figure 5:
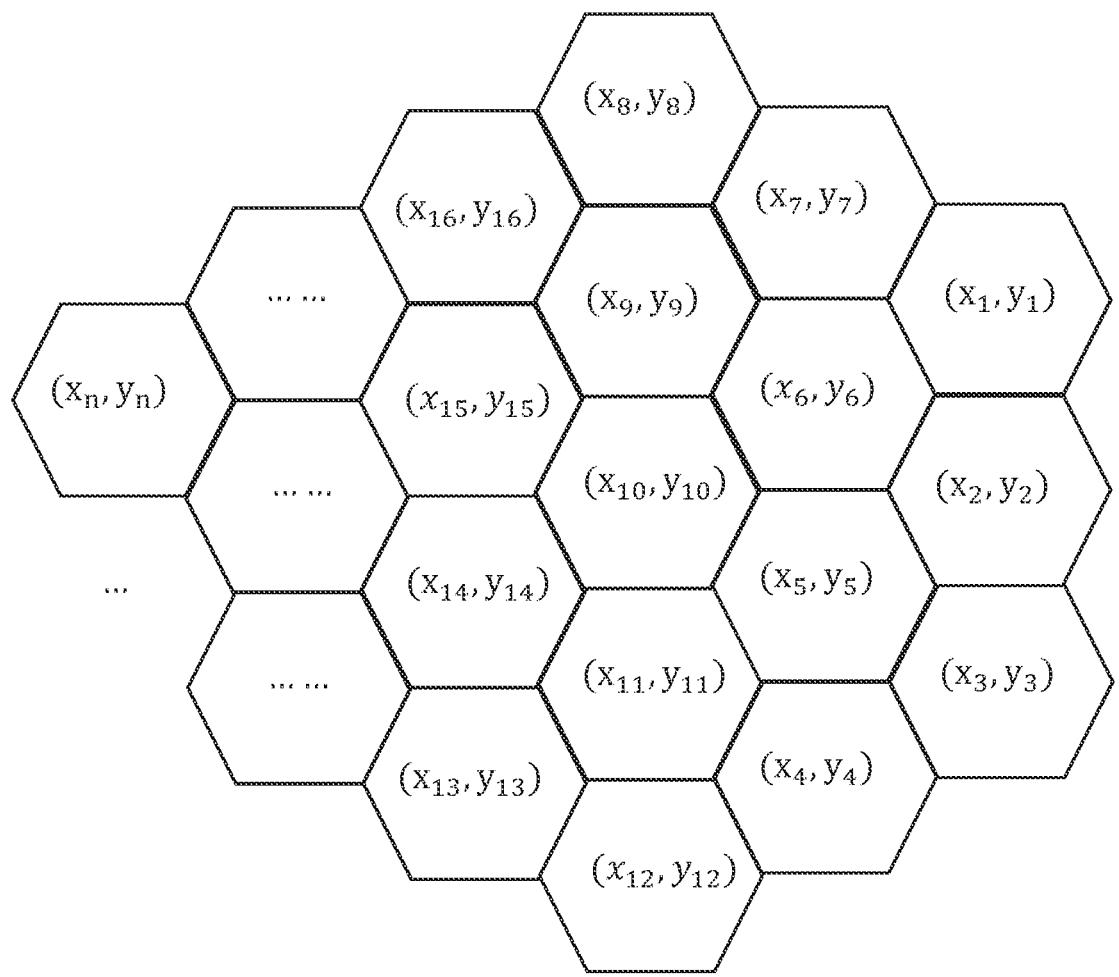
FIG. 5 is a schematic diagram illustrating an exemplary process for generating a plurality of second gas service areas according to some embodiments of the present disclosure.

FIG. 5 is a schematic diagram illustrating an exemplary process for generating a plurality of second gas service areas according to some embodiments of the present disclosure.

In some embodiments, a smart gas management platform may generate the plurality of second gas repair-reporting areas by performing a cluster analysis based on area attributes. Each cluster obtained by the cluster analysis is one second gas repair-reporting area and a cluster center of the cluster analysis is determined based on future gas repair-reporting frequencies of the plurality of first gas repair-reporting areas and future gas repair-reporting levels of the plurality of first gas repair-reporting areas.

A count of basic cluster centers may refer to a preset count of the cluster centers that needs to be adjusted. In some embodiments, the smart gas management platform may obtain the count of manually set basic cluster centers through a government user sub-platform.

In some embodiments, the count of the cluster centers may be related to an average future gas repair-reporting volume of the plurality of first gas repair-reporting areas.

The greater the average future gas repair-reporting volume is, the more maintenance personnel are required. A target area composed of the plurality of first gas repair-reporting areas may be divided into more second gas repair-reporting areas and accordingly, more cluster centers are set.

In some embodiments, the smart gas management platform may adjust the count of the basic cluster centers based on the average future gas repair-reporting volume of the target area to determine the count of the cluster centers. If the average future gas repair-reporting volume of the target area is relatively great, the smart gas management platform may increase the count of the basic cluster centers, and vice versa. For example, when a basic average future gas repair-reporting volume is p, the corresponding count of basic cluster centers is q. If the average future gas repair-reporting volume of the target area is increased by a relative to the basic average future gas repair-reporting volume, the count of cluster centers of the target area is relatively is increased by n relative to the count of basic cluster centers.

In some embodiments, the smart gas management platform may determine a cluster center position of the cluster analysis based on the future gas repair-reporting frequencies of the plurality of first gas repair-reporting areas and the future gas repair-reporting levels of the plurality of first gas repair-reporting areas. For example, the smart gas management platform may perform a weighted calculation on the emergency repair-reporting volumes of the future gas repair-reporting volumes and the future gas repair-reporting frequencies, arrange the calculated values in descending order, and select first gas repair-reporting areas corresponding to top values that satisfy the count of the cluster centers as the cluster centers. The weight may be determined based on experience. Exemplarily, if the count of cluster centers is 3, the emergency repair-reporting volumes of the future gas repair-reporting volumes of the first gas repair-reporting area 1-5 are respectively 10 cases, 8 cases, 9 cases, 4 cases, and 3 cases, the weight corresponding to the emergency repair-reporting volume of the future gas repair-reporting volume is 0.6, the future gas repair-reporting frequencies are respectively 18 cases per day, 20 cases per day, 17 cases per day, 6 cases per day, and 8 cases per day, and the weight corresponding to the future gas repair-reporting frequency is 0.4, the calculated values are respectively: 13.2, 12.8, 12.2, 4.8, 5. The calculated values may be arranged in descending order as 13.2, 12.8, 12.2, 5, and 4.8, and the first gas repair-reporting areas 1, 2, and 3 corresponding to the top three values may be selected as the cluster centers.

The cluster center position of the cluster analysis is determined based on the future gas repair-reporting frequencies of the plurality of first gas repair-reporting areas and the future gas repair-reporting levels of the plurality of first gas repair-reporting areas, so that the first gas repair-reporting areas with relatively great emergency repair-reporting volumes and relatively high future gas repair-reporting frequencies may be evenly distributed in the second gas repair-reporting areas. In this way, a problem of delayed processing due to concentrated emergency repair-reporting or a high repair-reporting frequency of a certain area can be avoided, thereby improving the user experience.

In some embodiments, the smart gas management platform may determine the second gas repair-reporting areas by performing clustering based on the distances between central positions of the plurality of first gas repair-reporting areas and the central positions of the clustering centers. In some embodiments, a clustering basis of the cluster analysis performed by the smart gas management platform is the distances from the central positions of the first gas repair-reporting areas to the central positions of the cluster centers and the distances may be determined based on the central position coordinates in the area attributes. In some embodiments, a cluster frequency is related to the frequency of determining the area attributes. The greater the frequency of determining the area attributes is, the greater the cluster frequency is. The cluster frequency may refer to a count of times clustering is performed per unit time, for example, the cluster frequency may be 1 time per day. For more descriptions about the frequency of determining the area attributes, please refer to FIG. 4 and related description thereof.

As shown in FIG. 5, the first gas repair-reporting area may be represented by a small hexagonal area. In some embodiments, the first gas repair-reporting area may be further represented by other shapes, which only needs to meet a requirement that there is no gap in the overall area formed by the shapes of the plurality of first gas repair-reporting areas. $(x_1, y_1)$ to $(x_n, y_n)$ are the coordinates of the central positions of the first gas repair-reporting areas 1-n respectively and $(x_6, y_6)$, $(x_{12}, y_{12})$, and $(x_{15}, y_{15})$ are the cluster centers determined based on the above. The specific operations of the cluster are as follows.

In S510, calculating, based on the central position coordinate of the first gas repair-reporting area to be distributed (hereinafter referred to as the area to be distributed) and the position coordinates of the cluster centers, distances between the area to be distributed and the plurality of cluster centers.

In some embodiments, the smart gas management platform may calculate the distances between the area to be distributed and the plurality of cluster centers in various ways, including but not limited to a Euclidean distance, a cosine distance, a Mahalanobis distance, a Chebyshev distance, a Manhattan distance, etc. For example, as shown in FIG. 5, the smart gas management platform may calculate the distances between the central position coordinate $(x_1, y_1)$ of the area 1 to be distributed and the cluster center of the first gas repair-reporting area 6 $(x_6, y_6)$, the cluster center of the first gas repair-reporting area 12 $(x_{12}, y_{12})$, the cluster center of the first gas repair-reporting area 15 $(x_{15}, y_{15})$ based on the area 1 to be distributed.

In S520, determining a shortest distance by comparing the determined distances between the area to be distributed and the plurality of cluster centers.

In some embodiments, the smart gas management platform may sort the determined distances between the area to be distributed and the plurality of cluster centers from smallest to largest and determine the shortest distance based on a sorting result. For example, as shown in FIG. 5, the smart gas management platform may sort the distances I1, I2, I3 between the central position coordinate $(x_1, y_1)$ of the first gas repair-reporting area 1 and the plurality of cluster centers $(x_6, y_6)$, $(x_{12}, y_{12})$, and $(x_{15}, y_{15})$ from smallest to largest as $I_1 < I_3 < I_2$.

In S530, in response to that there is only one shortest distance, distributing the area to be distributed to the cluster center corresponding to the shortest distance.

In some embodiments, if there is only one shortest distance, the smart gas management platform may directly distribute the area to be distributed to the cluster center corresponding to the shortest distance. For example, as shown in FIG. 5, the smart gas management platform may distribute the first gas repair-reporting area 1 to the first gas repair-reporting area 6 corresponding to the cluster center (x6, y6).

In S540, in response to that there are a plurality of shortest distances, storing the area to be distributed and the cluster centers corresponding to the plurality of shortest distances as a set of data in a secondary distribution set.

In some embodiments, if there are the plurality of shortest distances, the smart gas management platform may store the area to be distributed and the cluster centers corresponding to the plurality of shortest distances as a set of data in the secondary distribution set. For example, as shown in FIG. 5, if the distance between the first gas repair-reporting area 9 (x9, y9) and the cluster center (x6, y6) of the first gas repair-reporting area 6 and the distance between the first gas repair-reporting area 9 (x9, y9) and the cluster center $(x_{15}, y_{15})$ of the first gas repair-reporting area 15 are both the shortest distance, the first gas repair-reporting area and the cluster centers as a set of data in the secondary distribution set.

In S550, selecting the next area to be distributed and repeating the operations S510-S540 until all areas to be distributed are traversed.

In S560, for each set of data in the secondary distribution set, determining an existing future gas repair-reporting volume of the clusters corresponding to the plurality of cluster centers in each set of data and allocating the area to be distributed in the set of data to a cluster with a smallest existing future gas repair-reporting volume of the plurality of clusters with the shortest distance. If there are clusters with the same existing future gas repair-reporting volume, the area to be distributed may be randomly distributed to any cluster with the smallest existing future gas repair-reporting volume, or distributed to a cluster with a smaller future emergency repair-reporting volume or a lower future gas repair-reporting frequency until all the areas to be distributed in the set are distributed. A manner for determining the cluster center with the smaller future emergency repair-reporting volume and the lower future gas repair-reporting frequency, please refer to the manner for determining the cluster center.

The existing future gas repair-reporting volume may refer to a sum of the future gas repair-reporting volumes of all the first gas repair-reporting areas that have been distributed to the cluster. As shown in FIG. 5, if the distances between the first gas repair-reporting area 9 (x9, y9) and the cluster center (x6, y6) of the first gas repair-reporting area 6 and the distance between the first gas repair-reporting area 9 (x9, y9) and the cluster center $(x_{15}, y_{15})$ of the first gas repair-reporting area 15 are both the shortest distance, if at this time, the existing future gas repair-reporting volume of a cluster 1 (corresponding to the cluster center $(x_6, y_6)$) is 500 and the existing future gas repair-reporting volume of a cluster 2 (corresponding to the cluster center $(x_{15}, y_{15})$) is 300, the smart gas management platform may distribute the first gas repair-reporting area 9 (x9, y9) to the cluster 2.

The area to be distributed is distributed to the cluster with the smallest future gas repair-reporting volume through the secondary distribution in the clustering process, so that the future gas repair-reporting volume of each second gas repair-reporting area may be as balanced as possible, which facilitates a balanced distribution of the maintenance personnel, thereby improving maintenance efficiency and improving user experience.

In some embodiments of the present disclosure, by correlating the count of cluster centers with the average future gas repair-reporting volume of the plurality of first gas repair-reporting areas, the second gas repair-reporting areas may be divided according to actual maintenance needs, so as to arrange personnel in a more refined manner.

One or more embodiments of the present disclosure further provide a non-transitory computer-readable storage medium storing computer instructions. When reading the computer instructions in the storage medium, a computer implements the method for gas repair-reporting management based on a call center of smart gas.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for gas repair-reporting management based on a call center of smart gas, implemented by an Internet of Things (IoT) system for gas repair-reporting management based on a call center of smart gas, wherein the IoT system includes a smart gas user platform, a smart gas service platform, a smart gas management platform, a smart gas sensor network platform, and a smart gas object platform that interact in turn, wherein the smart gas management platform includes a smart customer service management sub-platform, a smart operation management sub-platform, and a smart gas data center;

the smart gas user platform is configured as a terminal device; the terminal device includes at least one of a mobile device and a tablet computer; the smart gas user platform includes a government user sub-platform;

the smart gas sensor network platform is configured as a communication network and a gateway;

the smart gas object platform includes a gas device and other devices, the gas device includes an indoor device and a pipeline network device, and the other devices include a monitoring device, a temperature sensor, or a pressure sensor;

the smart gas service platform interacts with the smart gas management platform downwards, the smart gas service platform issues a gas maintenance management information query instruction to the smart gas data center and receive a gas maintenance management information uploaded by the smart gas data center; and the smart gas service platform receives the gas maintenance management information query instruction issued by the government user sub-platform and upload the gas maintenance management information to the government user sub-platform; the smart gas data center receives a customer feedback information issued by the smart gas service platform, receives the gas maintenance management information query instruction issued by the smart gas service platform, and uploads the gas maintenance management information to the smart gas service platform; the smart gas data center further interacts downward with the smart gas sensor network platform, issues an instruction for obtaining data related to the gas device to the smart gas sensor network platform, and receives the data related to the gas device uploaded by the smart gas sensor network platform; the smart gas sensor network platform receives the data related to the gas device uploaded by the smart gas object platform and issues the instruction for obtaining the data related to the gas device to the smart gas object platform, and receives the instruction for obtaining the data related to the gas device issued by the smart gas data center and uploads the data related to the gas device to the smart gas data center; and the method is executed by a processor in the smart gas management platform, and the method comprises:

obtaining, based on the smart gas object platform, historical gas use data and historical gas repair-reporting data through the smart gas sensor network platform;

generating, based on the historical gas use data and the historical gas repair-reporting data, a plurality of first gas repair-reporting areas;

generating, at least based on the historical gas use data of the plurality of first gas repair-reporting areas and the historical gas repair-reporting data of the plurality of first gas repair-reporting areas, future gas repair-reporting data of the plurality of first gas repair-reporting areas, the historical gas repair-reporting data at least including a historical gas repair-reporting volume and a historical gas repair-reporting level and the future gas repair-reporting data at least including a future gas repair-reporting volume and a future gas repair-reporting level;

generating, based on the plurality of first gas repair-reporting areas and the future gas repair-reporting data of the plurality of first gas repair-reporting areas, a plurality of second gas repair-reporting areas and future gas repair-reporting data corresponding to the plurality of second gas repair-reporting areas;

wherein the generating, at least based on the historical gas use data of the plurality of first gas repair-reporting areas and the historical gas repair-reporting data of the plurality of first gas repair-reporting areas, future gas repair-reporting data of the plurality of first gas repair-reporting areas includes:

inputting the historical gas use data of the plurality of first gas repair-reporting areas and the historical gas repair-reporting data of the plurality of first gas repair-reporting areas into a gas repair-reporting model;

processing the historical gas use data of the plurality of first gas repair-reporting areas and the historical gas repair-reporting data of the plurality of first gas repair-reporting areas using the gas repair-reporting model; and outputting the future gas repair-reporting data of the plurality of first gas repair-reporting areas, wherein the gas repair-reporting model is a machine learning model;

wherein the gas repair-reporting model includes a feature extraction layer and a prediction layer, the feature extraction layer is a transformer model, and the prediction layer is a convolutional neural networks (CNN) model; an input of the feature extraction layer is the historical gas use data of the plurality of first gas repair-reporting areas and the historical gas repair-reporting data of the plurality of first gas repair-reporting areas, and an output of the feature extraction layer is area features of the plurality of first gas repair-reporting areas; an input of the prediction layer is the area features of the plurality of first gas repair-reporting areas and time data, and an output of the prediction layer is the future gas repair-reporting data of the plurality of first gas repair-reporting areas; wherein the feature extraction layer and the prediction layer are obtained through joint training, and a training process of the joint training includes:

inputting historical gas use data of a sample first gas repair-reporting area corresponding to a sample time and historical gas repair-reporting data of the sample first gas repair-reporting area corresponding to the sample time to an initial feature extraction layer;

obtaining area features of the sample first gas repair-reporting area corresponding to the sample time output by the initial feature extraction layer;

inputting the area feature of the sample first gas repair-reporting area corresponding to the sample time to an initial prediction layer;

obtaining future gas repair-reporting data of the sample first gas repair-reporting area corresponding to the sample time output by the initial prediction layer:

obtaining a label of training sample based on the future gas repair-reporting data of the sample first gas repair-reporting area corresponding to the sample time in historical data; wherein a future period of time corresponding to the future gas repair-reporting data is a period of time in the historical data;

constructing a loss function based on the label and an output result of the initial prediction layer;

updating parameters of the initial feature extraction layer and the initial prediction layer until a preset condition is met and completing the training process; wherein the preset condition is at least one of the loss function being smaller than a first threshold, the loss function converging, and a training period reaching a second threshold;

generating, based on the future gas repair-reporting data of the plurality of second gas repair-reporting areas, a maintenance personnel arrangement plan;

uploading the maintenance personnel arrangement plan to the smart gas user platform by the smart gas service platform; and feeding a reminder related to the maintenance personnel arrangement plan back to a user by the smart gas user platform; wherein the maintenance personnel arrangement plan includes at least one of a count of maintenance personnel, a maintenance time, and a maintenance position.

2. The method of claim 1, wherein the smart gas user platform further includes a gas user sub-platform and a supervision user sub-platform, wherein the gas user sub-platform corresponds to a gas user, the government user sub-platform corresponds to a government user, and the supervision user sub-platform corresponds to a supervision user; and the smart gas service platform includes a smart user service sub-platform, a smart operation service sub-platform, and a smart supervision service sub-platform, wherein the smart user service sub-platform corresponds to the gas user sub-platform, the smart operation service sub-platform corresponds to the government user sub-platform, and the smart supervision service sub-platform corresponds to the supervision user sub-platform.

3. The method of claim 1, wherein the smart customer service management sub-platform is in a bidirectional interaction with the smart gas data center, the smart operation management sub-platform is in the bidirectional interaction with the smart gas data center, and the smart customer service management sub-platform and the smart operation management sub-platform obtain data from the smart gas data center and feedback corresponding operation information;

the smart gas object platform includes an indoor gas device object sub-platform and a gas pipelineline network device object sub-platform, wherein the indoor gas device object sub-platform corresponds to an indoor device of a gas user and the gas pipelineline network device object sub-platform corresponds to a pipelineline network device of the gas user; and the smart gas sensor network platform includes a gas indoor device sensor network sub-platform and a gas pipelineline network device sensor network sub-platform, wherein the indoor gas device sensor network sub-platform corresponds to the indoor gas device object sub-platform and the gas pipelineline network device sensor network sub-platform corresponds to the gas pipelineline network device object sub-platform.

4. The method of claim 1, wherein the generating, based on the plurality of first gas repair-reporting areas and the future gas repair-reporting data of the plurality of first gas repair-reporting areas, a plurality of second gas repair-reporting areas and future gas repair-reporting data corresponding to the plurality of second gas repair-reporting areas includes:

generating, based on the plurality of first gas repair-reporting areas and the future gas repair-reporting data of the plurality of first gas repair-reporting areas, area attributes of the plurality of first gas repair-reporting areas, the area attributes including central position coordinates of the plurality of first gas repair-reporting areas, the future gas repair-reporting volumes of the plurality of first gas repair-reporting areas, future gas repair-reporting frequencies of the plurality of first gas repair-reporting areas, and the future gas repair-reporting levels of the plurality of first gas repair-reporting areas; and generating the plurality of second gas repair-reporting areas by fusing the plurality of first gas repair-reporting areas based on the area attributes.

5. The method of claim 4, wherein a frequency of determining the area attributes is related to time data.

6. The method of claim 4, wherein the generating the plurality of second gas repair-reporting areas by fusing the plurality of first gas repair-reporting areas based on the area attributes includes:

generating the plurality of second gas repair-reporting areas by performing a cluster analysis based on the area attributes, wherein each cluster obtained by the cluster analysis is one second gas repair-reporting area and a cluster center of the cluster analysis is determined based on the future gas repair-reporting frequencies of the plurality of first gas repair-reporting areas and the future gas repair-reporting levels of the plurality of first gas repair-reporting areas;

wherein the second gas repair-reporting area is determined by performing clustering based on distances between central positions of the plurality of first gas repair-reporting areas and central positions of the clustering centers, and operations of the clustering include:

calculating, based on a central position coordinate of an area to be distributed and the position coordinates of the cluster centers, distances between the area to be distributed and the plurality of cluster centers;

determining a shortest distance by comparing the distances between the area to be distributed and the plurality of cluster centers;

in response to that there is only one shortest distance, distributing the area to be distributed to the cluster center corresponding to the shortest distance;

in response to that there are a plurality of shortest distances, storing the area to be distributed and the cluster centers corresponding to the plurality of shortest distances as a set of data in a secondary distribution set;

for each set of data in the secondary distribution set, determining an existing future gas repair-reporting volume of the clusters corresponding to the plurality of cluster centers in each set of data and allocating the area to be distributed in the set of data to a cluster with an existing future gas repair-reporting volume meeting a gas repair-reporting volume requirement of the plurality of clusters with a distance meeting a distance requirement.

7. The method of claim 1, wherein the generating, based on the future gas repair-reporting data of the plurality of second gas repair-reporting areas, a maintenance personnel arrangement plan includes:

generating, based on the future gas repair-reporting data of the plurality of second gas repair-reporting areas, maintenance personnel demand data; and generating, based on the maintenance personnel demand data, the maintenance personnel arrangement plan.

8. An Internet of Things (IoT) system for gas repair-reporting management based on a call center of smart gas, comprising a smart gas user platform, a smart gas service platform, a smart gas management platform, a smart gas sensor network platform, and a smart gas object platform that interact in turn, wherein the smart gas management platform includes a smart customer service management sub-platform, a smart operation management sub-platform, and a smart gas data center;

the smart gas user platform is configured as a terminal device; the terminal device includes at least one of a mobile device and a tablet computer; the smart gas user platform includes a government user sub-platform;

the smart gas sensor network platform is configured as a communication network and a gateway;

the smart gas object platform includes a gas device and other devices, the gas device includes an indoor device and a pipeline network device, and the other devices include a monitoring device, a temperature sensor, or a pressure sensor;

the smart gas service platform interacts with the smart gas management platform downwards, the smart gas service platform issues a gas maintenance management information query instruction to the smart gas data center and receive a gas maintenance management information uploaded by the smart gas data center; and the smart gas service platform receives the gas maintenance management information query instruction issued by the government user sub-platform and upload the gas maintenance management information to the government user sub-platform; the smart gas data center receives a customer feedback information issued by the smart gas service platform, receives the gas maintenance management information query instruction issued by the smart gas service platform, and uploads the gas maintenance management information to the smart gas service platform; the smart gas data center further interacts downward with the smart gas sensor network platform, issues an instruction for obtaining data related to the gas device to the smart gas sensor network platform, and receives the data related to the gas device uploaded by the smart gas sensor network platform; the smart gas sensor network platform receives the data related to the gas device uploaded by the smart gas object platform and issues the instruction for obtaining the data related to the gas device to the smart gas object platform, and receives the instruction for obtaining the data related to the gas device issued by the smart gas data center and uploads the data related to the gas device to the smart gas data center; wherein the smart gas management platform is configured to:

obtain, based on the smart gas object platform, historical gas use data and historical gas repair-reporting data through the smart gas sensor network platform;

generate, based on the historical gas use data and the historical gas repair-reporting data, a plurality of first gas repair-reporting areas;

generate, at least based on the historical gas use data of the plurality of first gas repair-reporting areas and the historical gas repair-reporting data of the plurality of first gas repair-reporting areas, future gas repair-reporting data of the plurality of first gas repair-reporting areas, the historical gas repair-reporting data at least including a historical gas repair-reporting volume and a historical gas repair-reporting level and the future gas repair-reporting data at least including a future gas repair-reporting volume and a future gas repair-reporting level;

generate, based on the plurality of first gas repair-reporting areas and the future gas repair-reporting data of the plurality of first gas repair-reporting areas, a plurality of second gas repair-reporting areas and future gas repair-reporting data corresponding to the plurality of second gas repair-reporting areas; wherein the generate, at least based on the historical gas use data of the plurality of first gas repair-reporting areas and the historical gas repair-reporting data of the plurality of first gas repair-reporting areas, future gas repair-reporting data of the plurality of first gas repair-reporting areas includes:

inputting the historical gas use data of the plurality of first gas repair-reporting areas and the historical gas repair-reporting data of the plurality of first gas repair-reporting areas into a gas repair-reporting model;

processing the historical gas use data of the plurality of first gas repair-reporting areas and the historical gas repair-reporting data of the plurality of first gas repair-reporting areas using the gas repair-reporting model; and outputting the future gas repair-reporting data of the plurality of first gas repair-reporting areas, wherein the gas repair-reporting model is a machine learning model;

wherein the gas repair-reporting model includes a feature extraction layer and a prediction layer, the feature extraction layer is a transformer model, and the prediction layer is a convolutional neural networks (CNN) model; an input of the feature extraction layer is the historical gas use data of the plurality of first gas repair-reporting areas and the historical gas repair-reporting data of the plurality of first gas repair-reporting areas, and an output of the feature extraction layer is area features of the plurality of first gas repair-reporting areas; an input of the prediction layer is the area features of the plurality of first gas repair-reporting areas and time data, and an output of the prediction layer is the future gas repair-reporting data of the plurality of first gas repair-reporting areas; wherein the feature extraction layer and the prediction layer are obtained through joint training, and a training process of the joint training includes:
inputting historical gas use data of a sample first gas repair-reporting area corresponding to a sample time and historical gas repair-reporting data of the sample first gas repair-reporting area corresponding to the sample time to an initial feature extraction layer;
obtaining area features of the sample first gas repair-reporting area corresponding to the sample time output by the initial feature extraction layer;
inputting the area feature of the sample first gas repair-reporting area corresponding to the sample time to an initial prediction layer;
obtaining future gas repair-reporting data of the sample first gas repair-reporting area corresponding to the sample time output by the initial prediction layer;
obtaining a label of training sample based on the future gas repair-reporting data of the sample first gas repair-reporting area corresponding to the sample time in historical data; wherein a future period of time corresponding to the future gas repair-reporting data is a period of time in the historical data;
constructing a loss function based on the label and an output result of the initial prediction layer;
updating parameters of the initial feature extraction layer and the initial prediction layer until a preset condition is met and completing the training process; wherein the preset condition is at least one of the loss function being smaller than a first threshold, the loss function converging, and a training period reaching a second threshold;
generate, based on the future gas repair-reporting data of the plurality of second gas repair-reporting areas, a maintenance personnel arrangement plan;
upload the maintenance personnel arrangement plan to the smart gas user platform by the smart gas service platform; and
feed a reminder related to the maintenance personnel arrangement plan back to a user by the smart gas user platform; wherein the maintenance personnel arrangement plan includes at least one of a count of maintenance personnel, a maintenance time, and a maintenance position.

9. The IoT system of claim 8, wherein
the smart gas user platform further includes a gas user sub-platform and a supervision user sub-platform, wherein the gas user sub-platform corresponds to a gas user, the government user sub-platform corresponds to a government user, and the supervision user sub-platform corresponds to a supervision user; and
the smart gas service platform includes a smart user service sub-platform, a smart operation service sub-platform, and a smart supervision service sub-platform, wherein the smart user service sub-platform corresponds to the gas user sub-platform, the smart operation service sub-platform corresponds to the government user sub-platform, and the smart supervision service sub-platform corresponds to the supervision user sub-platform.

10. The IoT system of claim 8, wherein the smart customer service management sub-platform is in a bidirectional interaction with the smart gas data center, the smart operation management sub-platform is in the bidirectional interaction with the smart gas data center, and the smart customer service management sub-platform and the smart operation management sub-platform obtain data from the smart gas data center and feedback corresponding operation information;
the smart gas object platform includes an indoor gas device object sub-platform and a gas pipelineline network device object sub-platform, wherein the indoor gas device object sub-platform corresponds to an indoor device of a gas user and the gas pipelineline network device object sub-platform corresponds to a pipelineline network device of the gas user; and
the smart gas sensor network platform includes a gas indoor device sensor network sub-platform and a gas pipelineline network device sensor network sub-platform, wherein the indoor gas device sensor network sub-platform corresponds to the indoor gas device object sub-platform and the gas pipelineline network device sensor network sub-platform corresponds to the gas pipelineline network device object sub-platform.

11. The IoT system of claim 8, wherein the generating, based on the plurality of first gas repair-reporting areas and the future gas repair-reporting data of the plurality of first gas repair-reporting areas, a plurality of second gas repair-reporting areas and future gas repair-reporting data corresponding to the plurality of second gas repair-reporting areas includes:
generating, based on the plurality of first gas repair-reporting areas and the future gas repair-reporting data of the plurality of first gas repair-reporting areas, area attributes of the plurality of first gas repair-reporting areas, the area attributes including central position coordinates of the plurality of first gas repair-reporting areas, the future gas repair-reporting volumes of the plurality of first gas repair-reporting areas, future gas repair-reporting frequencies of the plurality of first gas repair-reporting areas, and the future gas repair-reporting levels of the plurality of first gas repair-reporting areas; and
generating the plurality of second gas repair-reporting areas by fusing the plurality of first gas repair-reporting areas based on the area attributes.

12. The IoT system of claim 11, wherein a frequency of determining the area attributes is related to time data.

13. The IoT system of claim 11, wherein the generating the plurality of second gas repair-reporting areas by fusing the plurality of first gas repair-reporting areas based on the area attributes includes:
generating the plurality of second gas repair-reporting areas by performing a cluster analysis based on the area attributes, wherein each cluster obtained by the cluster analysis is one second gas repair-reporting area and a cluster center of the cluster analysis is determined based on the future gas repair-reporting frequencies of the plurality of first gas repair-reporting areas and the future gas repair-reporting levels of the plurality of first gas repair-reporting areas;
wherein the second gas repair-reporting area is determined by performing clustering based on distances between central positions of the plurality of first gas repair-reporting areas and central positions of the clustering centers, and operations of the clustering include:
calculating, based on a central position coordinate of an area to be distributed and the position coordinates of the cluster centers, distances between the area to be distributed and the plurality of cluster centers;
determining a shortest distance by comparing the distances between the area to be distributed and the plurality of cluster centers;

in response to that there is only one shortest distance, distributing the area to be distributed to the cluster center corresponding to the shortest distance;

in response to that there are a plurality of shortest distances, storing the area to be distributed and the cluster centers corresponding to the plurality of shortest distances as a set of data in a secondary distribution set;

for each set of data in the secondary distribution set, determining an existing future gas repair-reporting volume of the clusters corresponding to the plurality of cluster centers in each set of data and allocating the area to be distributed in the set of data to a cluster with an existing future gas repair-reporting volume meeting a gas repair-reporting volume requirement of the plurality of clusters with a distance meeting a distance requirement.

14. A non-transitory computer-readable storage medium storing computer instructions, wherein when reading the computer instructions in the storage medium, a computer implements the method of claim 1.

* * * * *